US007826813B2

(12) United States Patent
Laroche (10) Patent No.: US 7,826,813 B2
(45) Date of Patent: Nov. 2, 2010

(54) METHOD AND SYSTEM FOR DETERMINING A TIME DELAY BETWEEN TRANSMISSION AND RECEPTION OF AN RF SIGNAL IN A NOISY RF ENVIRONMENT USING FREQUENCY DETECTION

(75) Inventor: Jean-Louis Laroche, Montreál (CA)

(73) Assignee: Orthosoft Inc., Montreal (CA)

( * ) Notice: Subject to any disclaimer, the term of this patent is extended or adjusted under 35 U.S.C. 154(b) by 544 days.

(21) Appl. No.: 11/951,661

(22) Filed: Dec. 6, 2007

(65) Prior Publication Data

US 2008/0153424 A1 Jun. 26, 2008

Related U.S. Application Data

(60) Provisional application No. 60/871,520, filed on Dec. 22, 2006.

(51) Int. Cl.
H04B 1/06 (2006.01)

(52) U.S. Cl. .............. 455/242.1; 455/67.16; 455/242.2; 455/230; 370/508; 375/226

(58) Field of Classification Search .............. 455/242.1, 455/67.16, 242.2, 230, 243.1, 60, 42, 139; 370/508, 517, 519; 375/226, 362
See application file for complete search history.

(56) References Cited

U.S. PATENT DOCUMENTS

| 3,766,545 | A | * | 10/1973 | Hikosaka | 341/111 |
|---|---|---|---|---|---|
| 4,133,037 | A | * | 1/1979 | Overman et al. | 702/72 |
| 4,145,704 | A | * | 3/1979 | Gallo | 386/21 |
| 4,337,433 | A | * | 6/1982 | Yoshimura | 327/270 |
| 4,358,736 | A | * | 11/1982 | De Boer | 327/3 |
| 4,370,619 | A | * | 1/1983 | Rijckaert | 327/12 |
| 4,524,448 | A | * | 6/1985 | Hullwegen | 375/371 |
| 5,177,487 | A | * | 1/1993 | Taylor et al. | 342/159 |
| 5,202,742 | A | * | 4/1993 | Frank et al. | 356/5.1 |
| 5,321,632 | A | * | 6/1994 | Otsuji et al. | 702/159 |
| 5,360,268 | A | * | 11/1994 | Hayashi et al. | 374/117 |
| 5,384,541 | A | * | 1/1995 | Chu et al. | 324/617 |
| 5,406,427 | A | * | 4/1995 | Shimoda | 360/51 |
| 5,574,707 | A | * | 11/1996 | Hirai | 369/47.31 |
| 6,181,184 | B1 | * | 1/2001 | Yamazaki et al. | 327/278 |
| 6,204,726 | B1 | * | 3/2001 | Toshinori | 329/304 |
| 6,218,982 | B1 | * | 4/2001 | Shirai et al. | 342/118 |
| 6,259,293 | B1 | * | 7/2001 | Hayase et al. | 327/276 |
| 6,288,699 | B1 | * | 9/2001 | Kubota et al. | 345/99 |

(Continued)

*Primary Examiner*—Minh D Dao
(74) *Attorney, Agent, or Firm*—Ogilvy Renault LLP (57) ABSTRACT

There present description is directed to a method and a system for determining a time delay between a transmission and a reception of an RF signal in a noisy environment. The method comprises: transmitting the RF signal according to a transmit frequency pattern, the transmit frequency pattern comprising at least three pulses separated by a period of time, each one of the at least three pulses respectively being at each one of at least three different frequencies; receiving a received RF signal comprising the at least three pulses at the at least three different frequencies, each one of the at least three different frequencies associated to a receive phase change; comparing the receive phase change of one of the at least three different frequencies with the receive phase change of another one of the at least three different frequencies to obtain a dispersion phase difference; and calculating the time delay using the obtained dispersion phase difference.

17 Claims, 6 Drawing Sheets

U.S. PATENT DOCUMENTS

| | | | | |
|---|---|---|---|---|
| 6,313,621 | B1* | 11/2001 | Zwack | 324/76.52 |
| 6,990,211 | B2* | 1/2006 | Parker | 381/310 |
| 2004/0156512 | A1* | 8/2004 | Parker | 381/74 |
| 2006/0232314 | A1* | 10/2006 | Hatani et al. | 327/231 |
| 2009/0197536 | A1* | 8/2009 | Whitaker | 455/63.1 |
| 2010/0013536 | A1* | 1/2010 | Lee et al. | 327/262 |

* cited by examiner

METHOD AND SYSTEM FOR DETERMINING A TIME DELAY BETWEEN TRANSMISSION AND RECEPTION OF AN RF SIGNAL IN A NOISY RF ENVIRONMENT USING FREQUENCY DETECTION

CROSS-REFERENCE TO RELATED APPLICATIONS

This patent application claims priority under 35 U.S.C. 119 of the U.S. provisional Patent Application No. 60/871,520 entitled "METHOD FOR DETERMINING A TIME DELAY BETWEEN TRANSMISSION AND RECEPTION OF AN RF SIGNAL IN A NOISY RF ENVIRONMENT USING FREQUENCY DETECTION" filed Dec. 22, 2006.

FIELD OF THE INVENTION

The present description deals with methods and devices for manipulation of RF signals in a noisy RF environment.

BACKGROUND OF THE INVENTION

Various environmental conditions, limited resources and system requirements often lead to situations where a transmitted radio-frequency (RF) signal arrives distorted and almost undistinguishable at a receiver. It thus becomes quite desirable to be able to recuperate the useful transmitted signal from various distorting noise components in a received signal.

The ability to distinguish a signal for transmission from various distorting noise components in a received signal is useful for measuring time delays and associated displacements more accurately. A time delay indicative of a physical or actual distance of a direct path from a transmitter to a receiver is inaccurate if it is based on measures taken from a signal experiencing one or more reflections along its path. Interference between the reflected signals can also cause discrepancies.

The greatest challenge in measuring accurate time delays between the transmission and the reception of a signal is to overcome multipath distortions such as signal reflections and diffraction. Multipath distortions can be caused by objects within the environment such as buildings, clouds, trees, and walls or objects within a closed area.

Since the growing potential of wireless solutions and a variety of other applications depend on enabling technologies such as time delay and distance measurement devices, efforts are herein directed to the recuperation of characteristics of an originally transmitted signal from a received, distorted signal comprising reflected reflected signals and other noise components.

SUMMARY OF THE INVENTION

It is therefore an aim of the present application to addresses issues associated with the prior art.

Therefore, in accordance with an embodiment, there is provided a method for determining a time delay between a transmission and a reception of an RF signal in a noisy environment. The method comprises: transmitting the RF signal according to a transmit frequency pattern, the transmit frequency pattern comprising at least three pulses separated by a period of time, each one of the at least three pulses respectively being at each one of at least three different frequencies; receiving a received RF signal comprising the at least three pulses at the at least three different frequencies, each one of the at least three different frequencies associated to a receive phase change; comparing the receive phase change of one of the at least three different frequencies with the receive phase change of another one of the at least three different frequencies to obtain a dispersion phase difference; and calculating the time delay using the obtained dispersion phase difference.

Further in accordance with another embodiment, there is also provided a system for determining a time delay between a transmission and a reception of an RF signal in a noisy environment. The system comprises: a signal transmitting device for transmitting the RF signal according to a transmit frequency pattern, the transmit frequency pattern comprising at least three pulses separated by a period of time, each one of the at least three pulses respectively being at each one of at least three different frequencies; a signal receiving device for receiving a received RF signal, the received RF signal comprising the at least three pulses at the at least three different frequencies, each one of the at least three different frequencies being associated to a receive phase change; and a processing device coupled to the signal receiving device, the processing device comprising a memory encoded with processing instructions for allowing the processing device to: compare the receive phase change of one of the at least three different frequencies with the receive phase change of another one of the at least three different frequencies to obtain a dispersion phase difference; and calculate the time delay using the obtained dispersion phase difference.

Further in accordance with yet another embodiment, there is also provided a computer-readable medium encoded with processing instructions for implementing a method, performed by a processing device, the method for determining a time delay between a transmission and a reception of an RF signal in a noisy environment. The method comprises: sending instructions to a transmitting device to transmit the RF signal according to a transmit frequency pattern, the transmit frequency pattern comprising at least three pulses separated by a period of time, each one of the at least three pulses respectively being at each one of at least three different frequencies; receiving from a receiving device, a received RF signal comprising the at least three pulses at the at least three different frequencies, each one of the at least three different frequencies being associated to a receive phase change; comparing the receive phase change of one of the at least three different frequencies with the receive phase change of another one of the at least three different frequencies to obtain a dispersion phase difference; and calculating the time delay using the obtained dispersion phase difference.

Further in accordance with still another embodiment, there is also provided an apparatus for determining a time delay between a transmission and a reception of an RF signal in a noisy environment. The apparatus comprises a processing device; a memory device accessible by the processing device; and an application coupled to the processing device. The application is configured for: sending instructions to a transmitting device to transmit the RF signal according to a transmit frequency pattern, the transmit frequency pattern comprising at least three pulses separated by a period of time, each one of the at least three pulses respectively being at each one of at least three different frequencies; receiving from a receiving device, a received RF signal comprising the at least three pulses at the at least three different frequencies, each one of the at least three different frequencies being associated to a receive phase change; comparing the receive phase change of one of the at least three different frequencies with the receive phase change of another one of the at least three different frequencies to obtain a dispersion phase difference; and calculating the time delay using the obtained dispersion phase difference.

DETAILED DESCRIPTION OF THE PREFERRED EMBODIMENT

Figure 1:
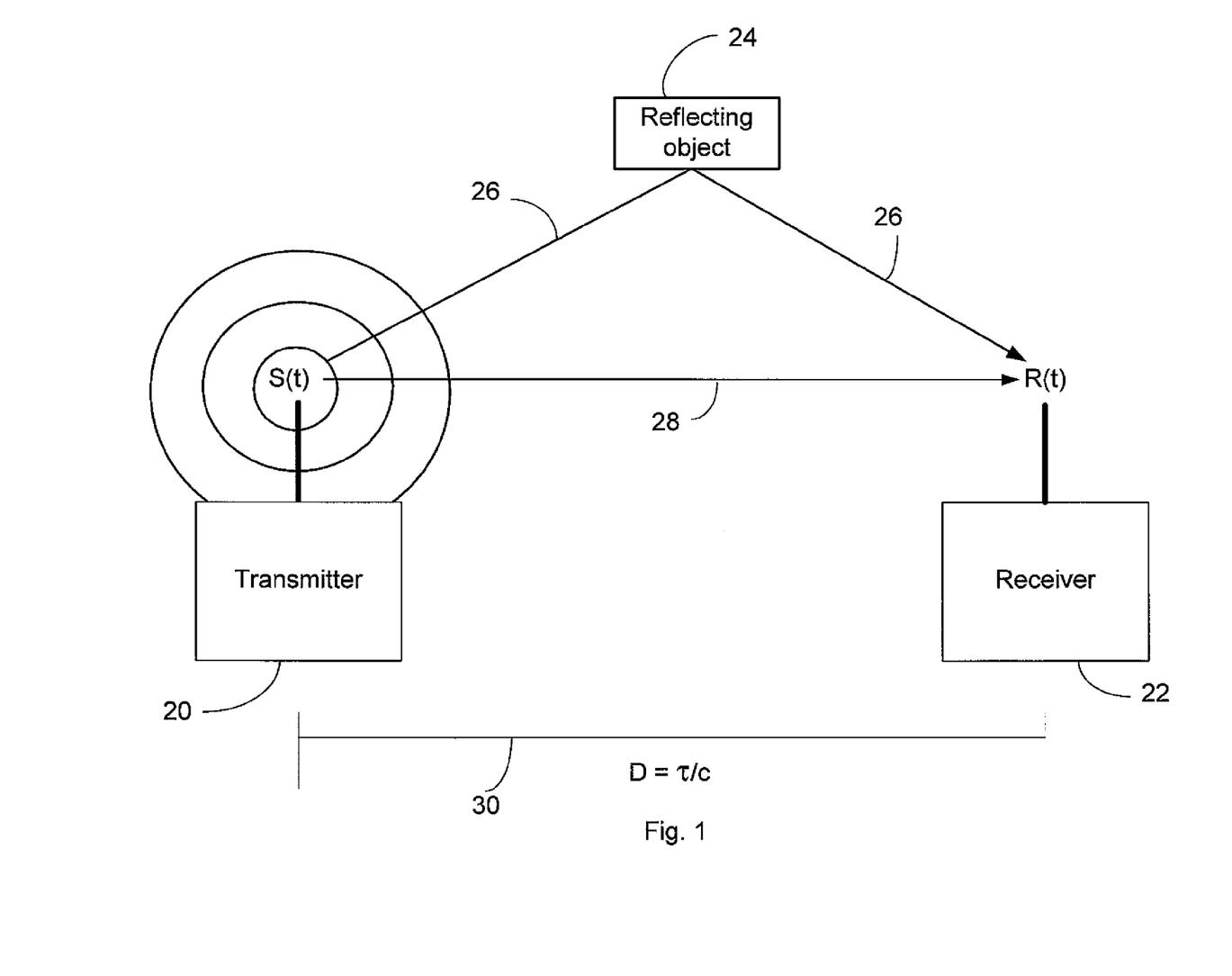
FIG. 1 is a schematic view of a transmission and a reception of an RF signal in an environment characterized by multipath distortions in accordance with an embodiment.

FIG. 1 illustrates the transmission and the reception of an RF signal in an environment wherein multipath distortions occur.

The transmitted signal S(t) is transmitted from a transmitter 20 (also referred to as a transmitting device). The receiver 22 (also referred to as a receiving device) receives signal R(t), which comprises the transmitted signal S(t) along with any noise and distortions N(t) component.

An example of one type of distortion is a reflection signal caused by an object 24 reflecting the signal S(t) transmitted from transmitter 20, thereby creating a distorted transmission path 26.

The transmission path 26 is thus a distortion of the direct path 28. Direct path 28 corresponds to the shortest distance 30 between transmitter 20 and receiver 22. The undistorted time delay associated with the RF signal traveling along direct path 28 is the time delay ($\tau$) between transmission and reception of the RF signal. Similarly, the shortest distance 30 is equal to the time delay ($\tau$) divided by the travel speed of the signal, which is usually set as the speed of light. It is understood that the travel speed of the signal can vary depending on the particular environment in which the signal travels.

In order to determine the time delay ($\tau$) associated with the transmission of the RF signal S(t) along direct path 28 until its reception at the end of the path 28, the transmitted signal S(t), delayed in time by an amount associated to the time delay ($\tau$), is distinguished amongst all of the signal components forming part of the received signal R(t), such as reflection signals and other distortions, together referred to as N(t).

Figure 2:
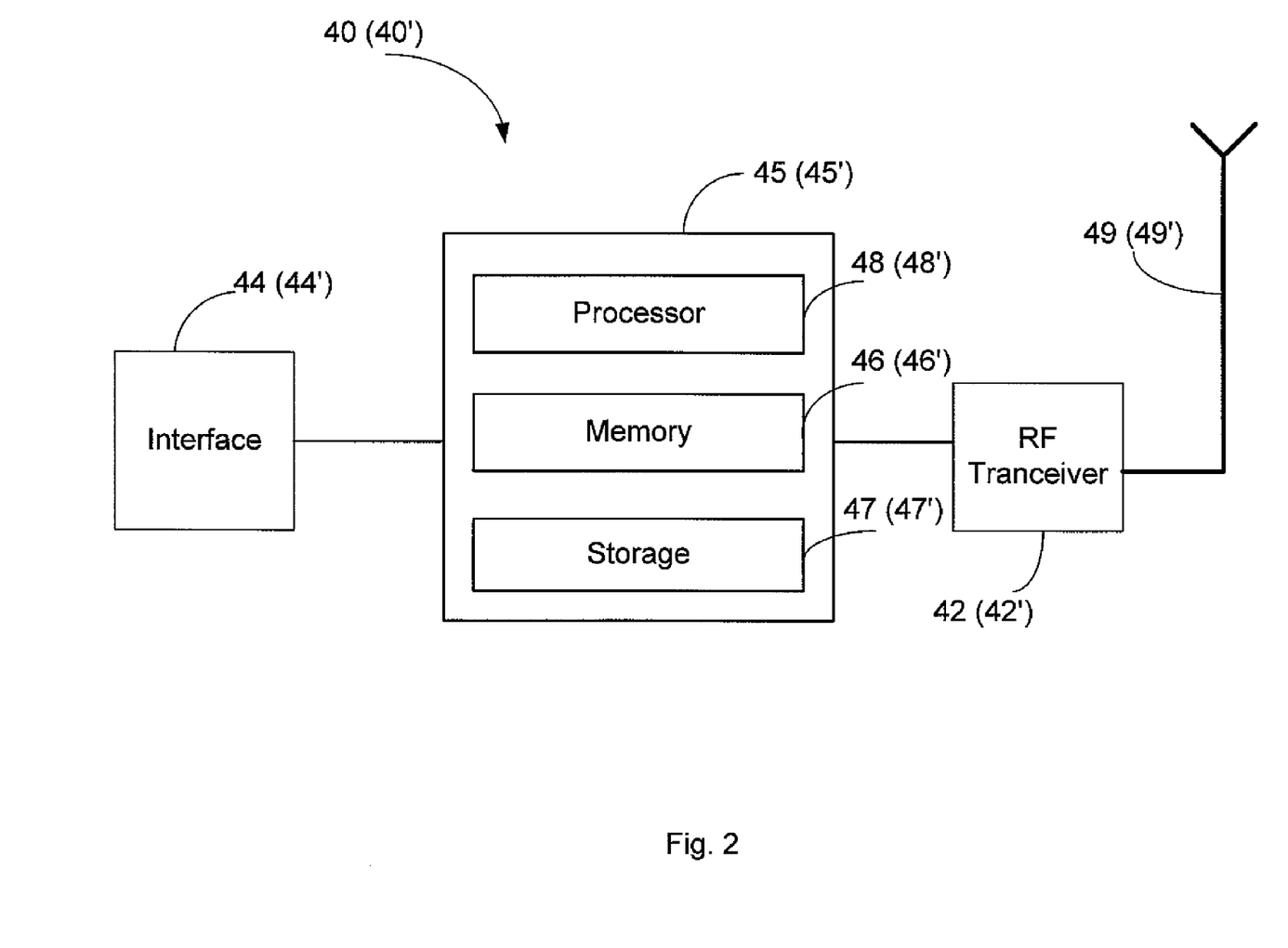
FIG. 2 is a schematic view of a system for determining a time delay between transmission and reception of an RF signal using frequency detection, in accordance with an embodiment.

FIG. 2 illustrates a system 40 for determining a time delay ($\tau$) between transmission and reception of an RF signal using an RF transceiver 42 which can be employed as a transmitting device and/or a receiving device.

The system 40 comprises at least one transceiver 42, an interface 44, and an analysis unit 45 for generating a signal S(t) for transmission and providing instructions to the transceiver 42 to transmit S(t); or for analyzing a signal R(t) received by the transceiver 42.

The analysis unit 45 has a memory device 46, another optional storing device 47 and a processing device 48.

Figure 6:
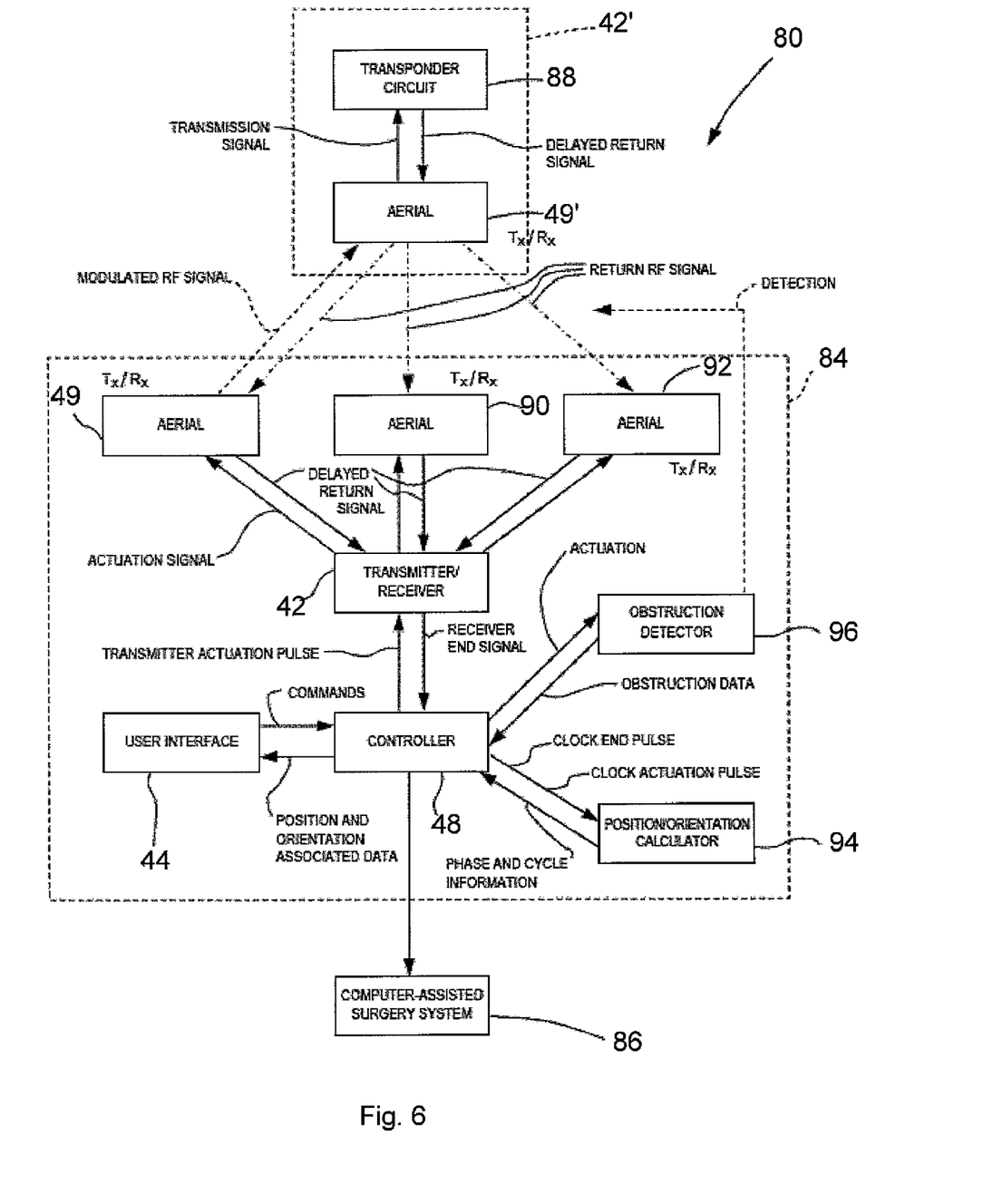
FIG. 6 is a schematic view of an example of an apparatus wherein the system of FIG. 2 and the method of FIG. 3 are applicable.

Transceiver 42 has an antenna 49, or optionally multiple antennas (also referred to as aerials), as better illustrated in FIG. 6.

The processing device 48 is in communication with the transceiver 42, the interface 44, the memory device 46 and the optional storing device 47.

The interface 44 allows the input of data, by a user or by an external application (not shown), to the system 40. The user interface 44 also allows for the output of data to an external application or to the user, by display or any other form of output.

The memory 46 is encoded with the necessary instructions for allowing the processing device 48 to determine the time delay ($\tau$) according to the method described hereinafter.

The storing device 47 has a database for storing all relevant characteristics of the received signal R(t) such as phase and frequency versus time responses, along with any relevant phase or frequency diagrams. The storing device 47 can also store characteristics of the phase or frequency pattern of the transmitted signal S(t).

The user interface 44, the processor 48, the memory device 46 and the storing device 47 are optionally embodied in analysis unit 45, in communication with the transceiver 42. However, each of the components of the analysis unit 45 can be separate and remote from each other. The transceiver 42 can also be located remotely from the analysis unit 45 or from any one of its independent components 46, 47 and 48.

Additional processing devices are optionally used, within system 40, or remotely from system 40, to provide for added processing power as necessary for executing at least parts of the instructions for allowing the processing devices to function together in determining the time delay ($\tau$).

According to an embodiment, to determine a time delay ($\tau$) between the transmission and reception of an RF signal, system 40 and another same system 40' can be used. For example, signal S(t) is first transmitted by the transceiver 42 according to the processing device's 48 instructions. The other system 40' having its own analysis unit 45' and interface 44', receives signal R(t) at its transceiver 42'.

If a transmit-and-return time delay is to be determined, then one analysis unit 45 can be used in combination with one or two transceivers, 42 and 42'. For example, the system 40 can have another transceiver 42' which communicates with the same analysis unit 45 and interface 44 as the transceiver 42.

Figure 3:
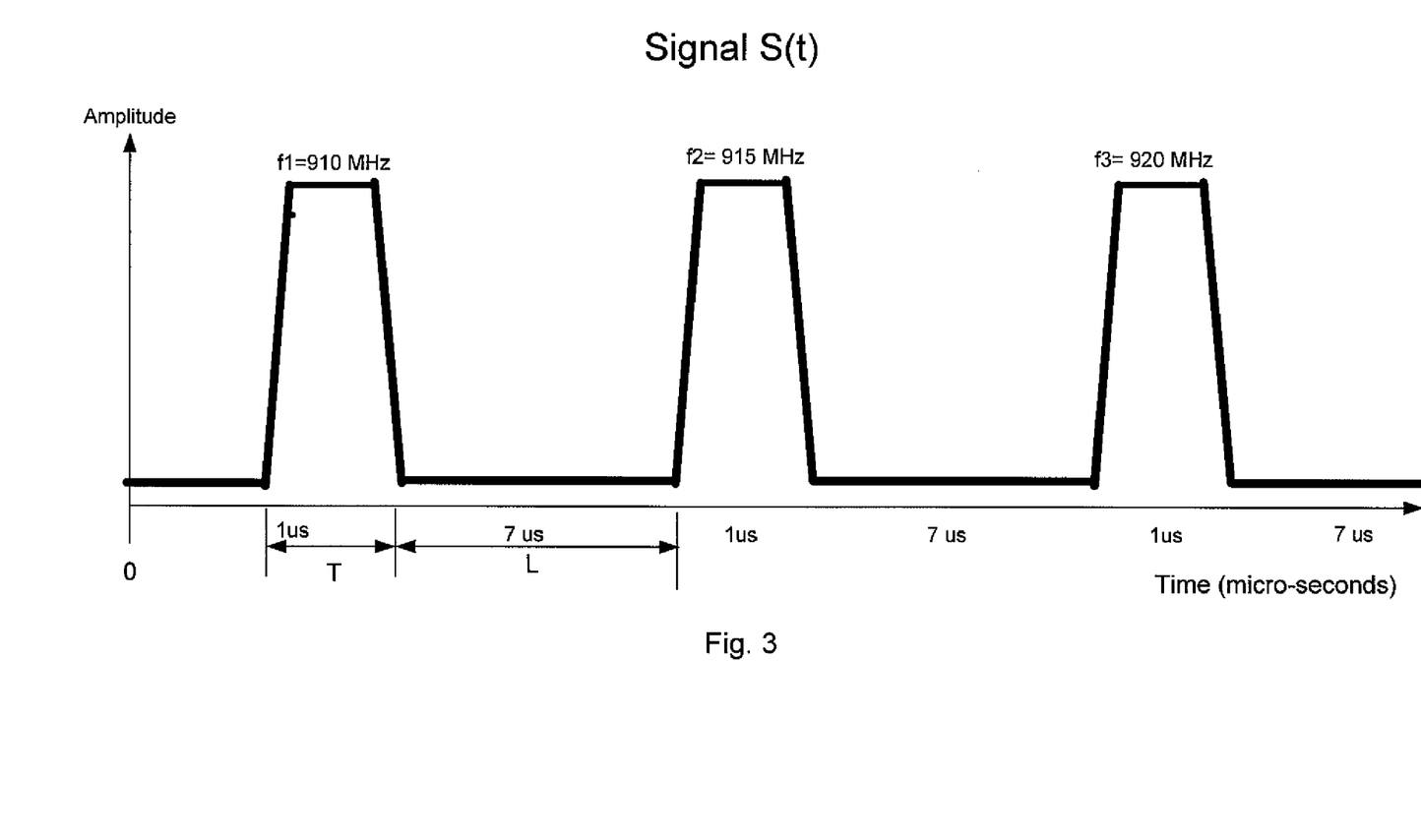
FIG. 3 is a block diagram illustrating a method for determining a time delay between transmission and reception of an RF signal using frequency detection, in accordance with an embodiment.

In any case, the systems 40 and 40' are configured to implement the method as illustrated in FIG. 3.

Now referring to FIG. 3, there is described a method for determining a time delay ($\tau$) between transmission and reception of an RF signal using frequency detection.

In step 50, the RF signal S(t) is transmitted using a transmitting device such as transmitter 20 or transceiver 42, and according the control of a processing device following memory-resident instructions, the processing device being in communication with the transmitting device.

The signal S(t) is transmitted according to a pre-defined frequency pattern. A frequency pattern can optionally be imposed on the transmitted signal S(t) before and/or during transmission of the signal S(t).

The signal S(t) is generated by a signal generator, according to the frequency pattern, ahead of actual transmission or concurrently with the transmission. In any case, a signal modulator, an interference device, a signal frequency shifting device or any combination thereof can be used to transmit the signal S(t) according to the pattern.

Figure 4:
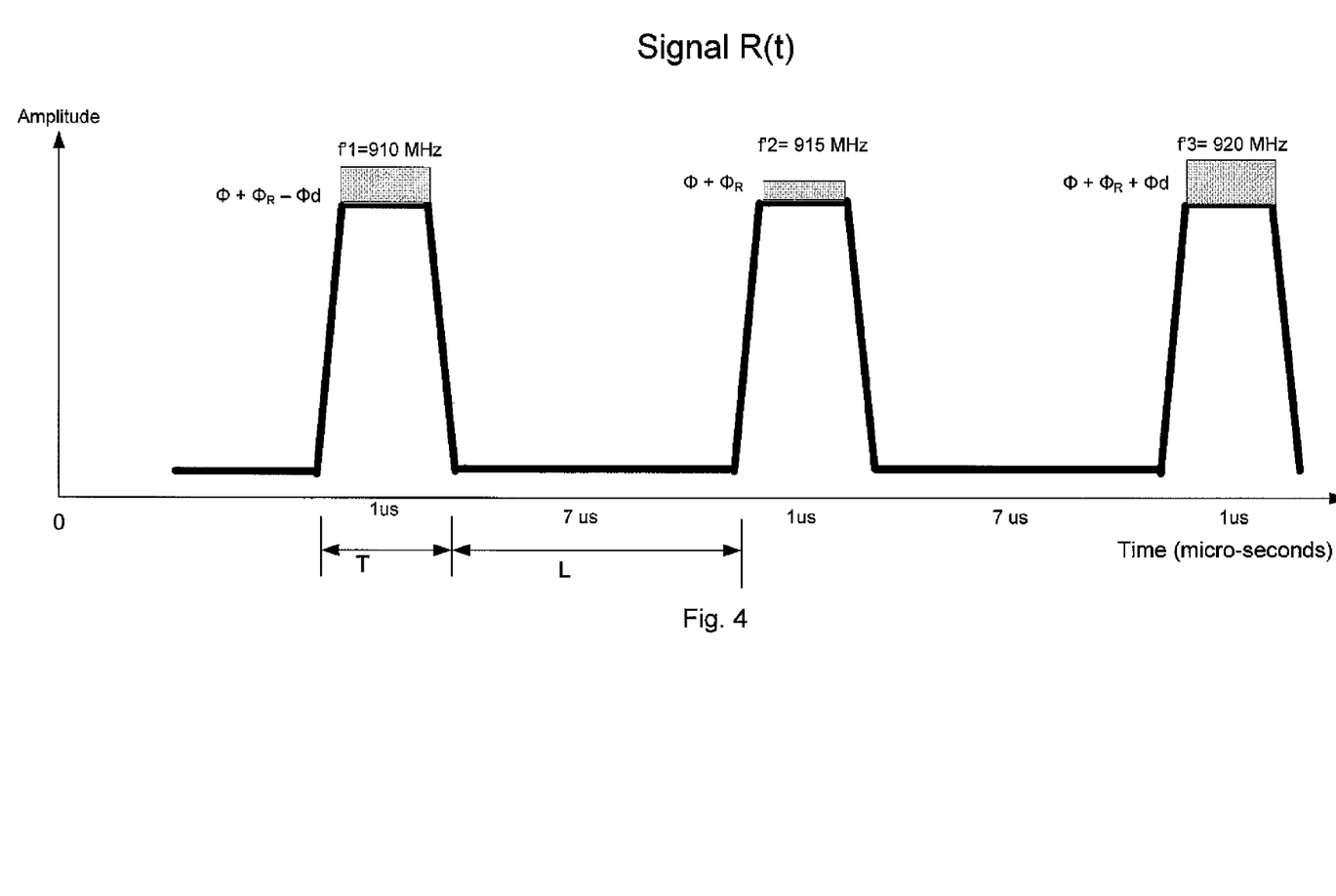
FIG. 4 is a graph which illustrates an example of a signal S(t) for transmission in the method of FIG. 3.

The frequency pattern has at least three different frequency components or tones f1, f2 and f3, centered around the middle frequency f2, and spaced apart by a given frequency difference Δf, as illustrated in FIG. 4.

For example, f1, f2 and f3 can be set at respectively 910 MHz, 915 MHz, and 920 MHz, each of the tones being spaced apart from a neighboring tone by a frequency difference Δf of 5 MHz. Other differences and combinations are also possible.

The transmitted signal S(t) is thus sent in time according to consecutive frequency pulses, each of the pulses being spaced in time by a given and pre-defined time period L.

Each pulse corresponds to one of the frequencies in the frequency pattern, f1, f2 and f3, and lasts for a given time duration T.

The phase of the transmitted signal S(t) is arbitrary and referred to as φ(t).

The specific characteristics of S(t) are pre-determined by the system based on test results as performed by the transceiver in combination with the processing device executing memory-resident instructions.

Alternatively, the given frequencies, the phase and the time periods L and T of S(t) may be entered in the system by a user through the interface.

In step 52, the received signal R(t), composed of the transmitted signal S(t) and the noise component N(t), is received at the receiving device, after a time delay (τ).

In step 54, the phases of each one of the frequency components f1, f2 and f3 of the received signal R(t) are determined by measurement and then analyzed. Respective phase responses or diagrams are also optionally obtained by sampling the received signal R(t) phase and frequency in the processing device or a sampling device within or separate from the processing device. The processing device executes memory-resident instructions to perform this analysis.

Figure 5:
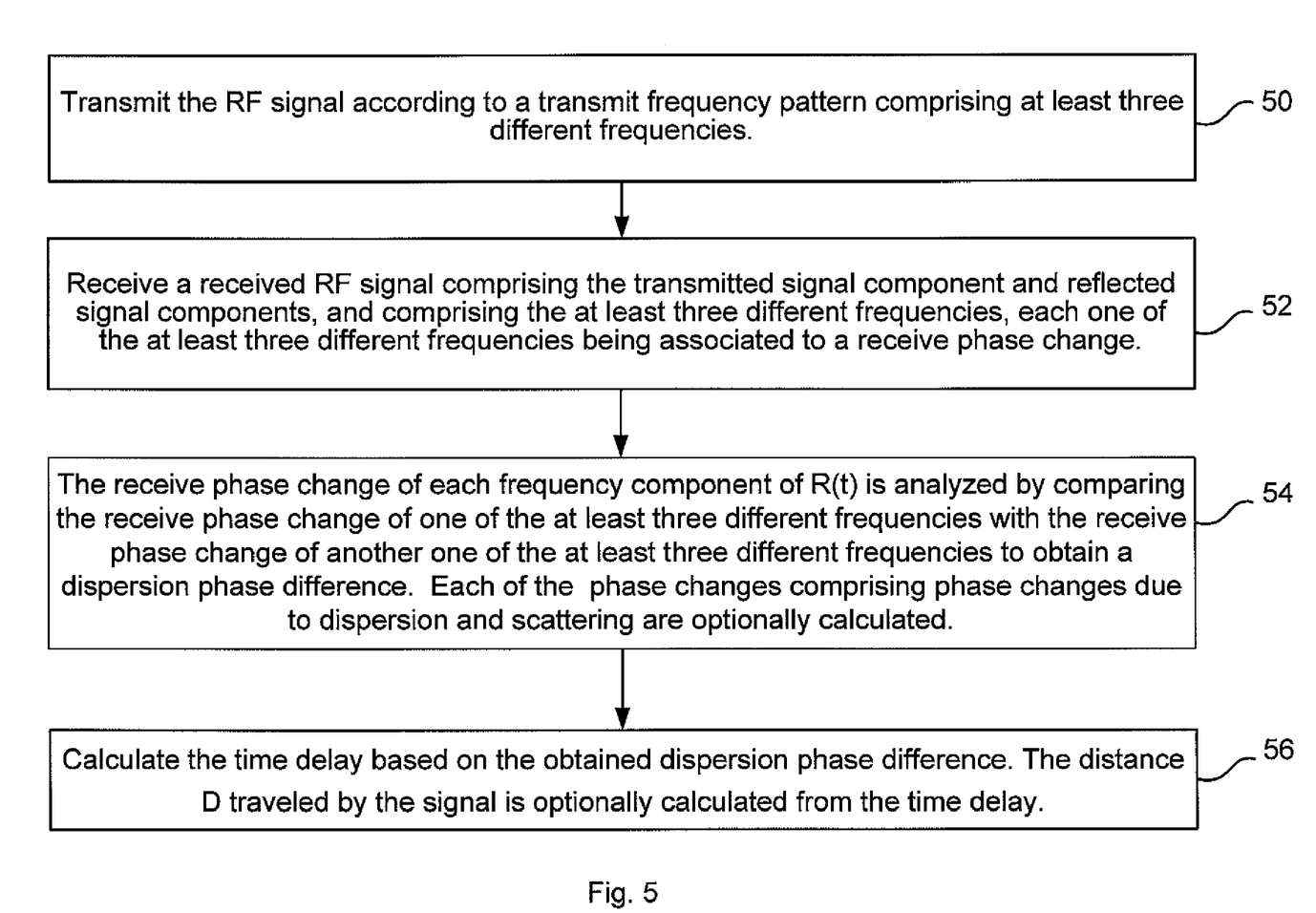
FIG. 5 is a graph which illustrates an example of a signal R(t) received by a receiver in the method of FIG. 3, and after transmission of the signal S(t) of FIG. 4.

FIG. 5 illustrates the amplitude versus time behavior of the signal R(t) received a time (τ) later than the transmission time. This time (τ) cannot be readily measured as being the start of reception since it is within a turbulence period b (not shown) wherein the signals received R(t) is unstable due to the reception of several other reflection or noise signal components N(t) at various points in time.

Each one of frequency components of R(t), f1, f2 and f3, respectively corresponds to each one of the frequency components f1, f2 and f3 of the transmitted signal S(t).

Each one of the frequency components of the received signal R(t) however have an associated amount of phase change φ'1, φ'2 and φ'3, which is different from the transmitted phase φ(t). Actually, the phase changes φ'1, φ'2 and φ'3 are equivalent to the sum of the transmitted phase φ(t) and all the phases of the reflection signals, $\phi_R(t)$, which are caused by multiple signal reflections.

However, the frequency components at each end of the pattern, f1 and f3, are also affected by dispersion and/or scattering phenomenon, which is proportional to the time delay (τ) between transmission and reception of the RF signal.

Hence, as illustrated in FIG. 5, f1 will see its phase φ'1 subtracted by a value φd as caused by the above-mentioned dispersion and/or scattering effects. In addition, f3 will see its phase φ'3 added with the value of φd. The following mathematical relations therefore apply:

$\phi'1 = \phi + \phi_R \phi d$ $\phi'2 = \phi + \phi_R$ $\phi'3 = \phi + \phi_R + \phi d$ Referring back to FIG. 3, the analysis of these phase changes φ'1, φ'2 and φ'3 involves a comparison of each of the phase changes with respect to each other in order to obtain the phase shift φd which is caused by dispersion and scattering effects. The phase shift φd is related to the time delay (τ) between transmission and reception.

For example, subtracting the phase response of f2, φ'2, from either one of the phase responses of f1 and f3, φ'1 or φ'3 can be used to determine the phase shift φd. Such a subtraction can be performed by an adding or a subtracting circuit means, within or separate from the processing device.

In step 56, the time delay (τ) is determined from the calculated phase shift φd.

For example, the time delay (τ) is proportional to the ratio φd/Δf. Hence, τ=B*(φd/Δf), where B=c²/4π, and c is the traveling speed of the RF signal within its environment.

The constant B does not need to be determined since relative measures can be taken to position an object in space with respect to pre-determined spatial references. This is an advantage, as the speed of the RF signal may change depending on the environmental conditions. A calibration process can however be performed in advance to determine the value of the constant B.

Still referring to FIG. 3, the distance D traveled by the transmitted signal S(t) until reception, or the distance between the transmitting device and the receiving device, can optionally then be determined using the known traveling speed c of the RF signal from transmission to reception.

For example, the distance D can be calculated using the following mathematical relations:

D=τ/c=(φd*c)/(4*π*Δf), where c is the traveling speed of the RF signal in space.

The value of the distance D can be useful in many practical applications, to position objects in space for example.

The system can then output, optionally via an interface, to a user or to an external application, the determined time delay (τ) and optionally, the distance D. The output can also optionally be displayed on a screen, or outputted through speakers and the like. For example, an interface can display the characteristics of both the sent S(t) and received R(t) signals on screen for a user to view the phase changes of each frequency components of the signals.

In the above-described method, step 52 is optionally performed by using multiple aerials to receive the received RF signal R(t).

In such a case, step 54 is performed using a known configuration of the aerials and combining the RE signals received by each one of the aerials according to the known configuration. More aerials can allow more accurate time delay measurements if properly configured.

Now referring to FIG. 6, there is shown a block diagram illustrating a tracking system 80 for use in computer-assisted surgery. System 80 represents an example of a possible application of an embodiment of the system 40 of FIG. 2 and related method of FIG. 3, as described hereinabove. FIG. 6 shows reference numerals similar to those used in describing FIG. 2 hereinabove for components which correspond to one another.

The tracking system 80 has a transponder device 42' (displaceable, with its independent power source) and a tracking station 84 (fixed). The tracking station 84 is optionally connected to a computer-assisted surgery system 86, or to another system requiring position and orientation data that will be produced by the tracking station 84.

The transponder device 42' is connectable to a tool or to another object (not shown) to be tracked in space for position and orientation.

The interrelation between the transponder device 42' and the object to be tracked is known (e.g., through calibration) such that a tracking of the transponder device 42' will enable the tracking station 84 to obtain position and/or orientation information pertaining to the object (e.g., tip of a tool).

The transponder device 42' has an aerial or antenna 49' connected to a transponder circuit 88. The aerial 49' is provided to receive incoming RF signals, and to emit response signals as a function of the incoming RF signals, as directed by the transponder circuit 88.

The tracking station 84 has a controller 48. The controller 48 is a processing unit (e.g., micro-controller, computer or the like) that controls the operation of the tracking station 84. The controller 48 is connected to a user interface 44, by which an operator may command the tracking system 80.

The controller 48 transmits position and/or orientation associated data to the user interface 44 as output from the tracking system 80.

Still referring to FIG. 6, the controller 48 is also connected to a transmitter/receiver or transceiver 42. The transmitter/receiver 42 is provided for emitting modulated RF signals through at least aerials 49, 90 and 92.

The transmitter/receiver 42 is also provided for receiving a return RF signal from the transponder device 42' using the aerials.

A position/orientation calculator 94 is connected to the controller 48. The position/orientation calculator 92 is typically a software or a drive associated with the controller 48 for implementing the method described hereinabove, and by which position and/or orientation pertaining to the transponder device 42' is determined.

For instance, an actuation pulse is sent to the position/orientation calculator 94. Phase measurement is considered by a phase comparator in the position/orientation calculator 96. Once a time delay ($\tau$) between transmission and reception of the RF signal at the transceiver 42 of the tracking station 84 is determined, the distance between the transponder device 42' and the tracking station 84 is calculated as half the value of the distance D corresponding to the time delay ($\tau$).

If orientation information is required, the object is equipped with either three of the transponder device 42' placed in a non-linear or orthogonal arrangement, or with one transponder device 42' having also at least three orthogonally oriented aerials 49' connected to the transponder circuit 86 via RF switches for example.

An optional obstruction detector 96 is also connected to the controller 48. The obstruction detector 96 is also typically a software or a drive associated with the controller 48 for implementing the method as described hereinabove with reference to FIG. 6, whereby an amount of phase change due to the effects of obstructions and reflections is calculated, and a specific cause of distortion is identified using the knowledge of the initially transmitted phase pattern.

The above-described system and method can vary according to several embodiments while still remaining within the scope of the present description.

For example, a transmitted signal S(t) which follows a pre-determined phase or frequency pattern can form a "key". The system has knowledge of the transmitted signal S(t) (i.e., of the "key") at all times.

The "key" (phase and frequency patterns of the transmitted signal S(t)) can be reconstructed using the information from the received signal R(t).

Since the received signal R(t) contains the sum of the transmitted signal with multiple reflected signals, herein also referred to as noise N(t), a knowledge of the initial phase and frequency patterns of S(t) (i.e., the "key") enables the identification of an amount of phase change due to such noise effects, and of an amount of phase change due to a time delay.

Once the amount of phase change related to distortions (noise and reflected signals) is obtained, it may be subtracted from the reconstructed received phase pattern in order to produce a corrected version of the received phase pattern.

The corrected version of the received phase pattern can then be compared to the transmitted "key" in order to more accurately find a true time delay and the related position or distance between transmission point and reception point.

Alternatively, once the phase change which is related to the time delay is known, the time delay itself, as well as the distance D traveled can be calculated.

The embodiments of the invention described above are intended to be exemplary only. The scope of the invention is therefore intended to be limited solely by the scope of the appended claims.

The invention claimed is:

1. A method for determining a time delay between a transmission and a reception of an RF signal in a noisy environment, the method comprising:
   transmitting the RF signal according to a transmit frequency pattern, the transmit frequency pattern comprising at least three pulses separated by a period of time, each one of the at least three pulses respectively being at each one of at least three different frequencies;
   receiving a received RF signal comprising the at least three pulses at the at least three different frequencies, each one of the at least three different frequencies associated to a receive phase change;
   comparing the receive phase change of one of the at least three different frequencies with the receive phase change of another one of the at least three different frequencies to obtain a dispersion phase difference; and
   calculating the time delay using the obtained dispersion phase difference.

2. The method of claim 1, wherein the transmitting comprises imposing a frequency pattern on the RF signal at a time corresponding to at least one of before and during the transmitting of the RF signal.

3. The method of claim 1, wherein the receiving comprises receiving a received RF signal, the received RF signal comprising the transmitted RF signal and a signal component N(t) which comprises a reflected RF signal.

4. The method of claim 1, wherein the comparing comprises comparing frequencies of a first and a third one of the at least three pulses in time to the second one of the at least three pulses.

5. The method of claim 4, wherein the comparing comprises subtracting the receive phase change of the second one of the at least three pulses from any one of the other ones of the at least three pulses.

6. The method of claim 1, further comprising determining an amount of the receive phase change for each one of the at least three pulses.

7. The method of claim 6, wherein the receiving comprises receiving multiple received RF signals at multiple aerials, and wherein the determining further comprises combining the received RF signals according to a configuration of the multiple aerials.

8. The method of claim 1, further comprising obtaining one of a phase and a frequency diagram corresponding to the received RF signal.

9. The method of claim 1, wherein the calculating comprises dividing the obtained dispersion phase difference by the difference in frequency between two consecutive ones of the at least three different frequencies.

10. The method of claim 1, further comprising outputting, via an interface, the calculated time delay and a physical distance associated with the time delay.

11. A system for determining a time delay between a transmission and a reception of an RF signal in a noisy environment, the system comprising:
- a signal transmitting device for transmitting the RF signal according to a transmit frequency pattern, the transmit frequency pattern comprising at least three pulses separated by a period of time, each one of the at least three pulses respectively being at each one of at least three different frequencies;
- a signal receiving device for receiving a received RF signal, the received RF signal comprising the at least three pulses at the at least three different frequencies, each one of the at least three different frequencies being associated to a receive phase change; and
- a processing device coupled to the signal receiving device, the processing device comprising a memory encoded with processing instructions for allowing the processing device to: compare the receive phase change of one of the at least three different frequencies with the receive phase change of another one of the at least three different frequencies to obtain a dispersion phase difference; and calculate the time delay using the obtained dispersion phase difference.

12. The system of claim 11, wherein the processing device comprises a sampling device for obtaining at least one of a receive phase and frequency diagram corresponding to the received RF signal, to determine the receive phase change.

13. The system of claim 11, wherein the processing device comprises one of an adding and a subtracting circuit means for subtracting the receive phase change of the second one of the at least three pulses from any one of the other ones of the at least three pulses.

14. The system of claim 11, wherein the signal transmitting device comprises at least one of a signal frequency modulator and a signal frequency generator.

15. The system of claim 11, wherein the signal receiving device comprises one or more aerials.

16. The system of claim 11, further comprising an interface for outputting at least one of the calculated time delay and a physical distance associated with the time delay.

17. An apparatus for determining a time delay between a transmission and a reception of an RF signal in a noisy environment, the apparatus comprising:
- a processing device;
- a memory device accessible by the processing device; and
- an application coupled to the processing device, the application configured for:
  - sending instructions to a transmitting device to transmit the RF signal according to a transmit frequency pattern, the transmit frequency pattern comprising at least three pulses separated by a period of time, each one of the at least three pulses respectively being at each one of at least three different frequencies;
  - receiving from a receiving device, a received RF signal comprising the at least three pulses at the at least three different frequencies, each one of the at least three different frequencies being associated to a receive phase change;
  - comparing the receive phase change of one of the at least three different frequencies with the receive phase change of another one of the at least three different frequencies to obtain a dispersion phase difference; and
  - calculating the time delay using the obtained dispersion phase difference.

* * * * *